Aug. 25, 1931.  W. E. OSTER  1,820,759
ARTIFICIAL FISH BAIT
Filed Aug. 28, 1930
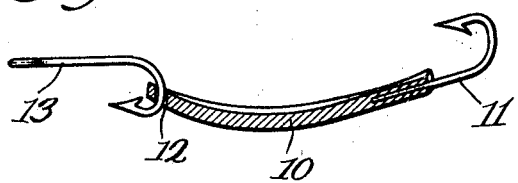
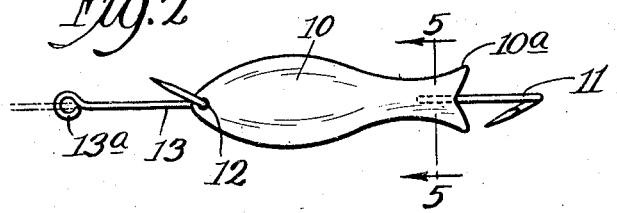
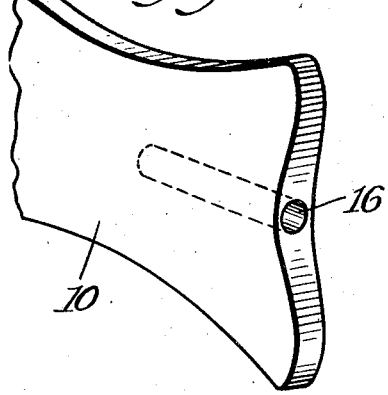
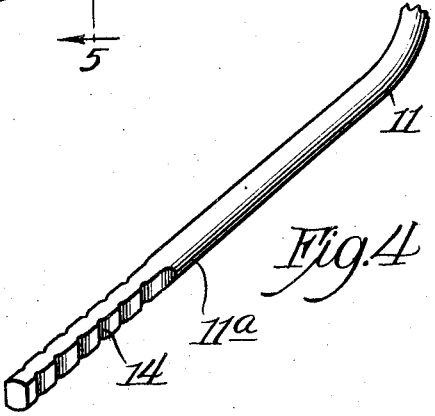
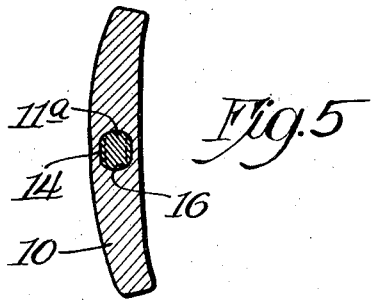
Inventor
Walter E. Oster
By George E. Mueller Atty.

Patented Aug. 25, 1931

1,820,759

UNITED STATES PATENT OFFICE

WALTER E. OSTER, OF CHICAGO, ILLINOIS

ARTIFICIAL FISH BAIT

Application filed August 28, 1930. Serial No. 478,351.

My invention relates to an artificial fish bait.

The principal object of the invention is the provision of an improved type of bait.

Another object is the provision of a fish bait which may be constructed in various sizes for different size fish without modification.

Another object is the provision of a fish bait of simple design and relatively great strength.

Other objects and features of the invention will be apparent from a consideration of the following description taken with the accompanying drawings, wherein, Fig. 1 is a longitudinal central sectional view taken through the fish bait, but showing the hooks in elevation.

Fig. 2 is a plan elevational view corresponding to Fig. 1,

Figs. 3 and 4 are enlarged views showing a detail of construction, and,

Fig. 5 is an enlarged sectional view taken along the line 5—5 of Fig. 2.

The bait comprises a spoon 10 in the shape of an artificial minnow with a rear hook 11 projecting centrally from the tail portion 10a. Near the head end of the minnow a perforation 12 is placed for attaching the minnow to a line, and in the present embodiment, a hook 13 extends through the perforation 12 and a line is attached directly to the hook 13. However, the minnow may be attached directly to the line without the hook 13, as appears clearly obvious.

Regarding the details of the minnow and hook, the hook projects directly from the rear edge of the minnow at the tail thereof. Figs. 3 and 4 show the manner in which the connection is made to obtain the most approved results. The shank 11a of the hook is provided with narrow ridges or corrugations 14 at two oppositely located places at the end of the shank. These parts of the shank bearing the corrugations or ridges are also partially flattened as clearly shown in Fig. 4. The minnow is prepared for the insertion of the shank of the rear hook by boring a hole 16 in the end thereof (Fig. 3), the two parts are assembled by inserting the shank into the opening 16 with the ridges 16 turned to the side or flat portions of the minnow, and the assembly is completed by forcing the metal of the minnow down into the irregularities on the shank. This prevents the hook from then being removed and the flat formation of the shank prevents the hook from turning. It has been found that an unusually strong construction results from this method of assembly, it having been found that with a bait in which the minnow is only three-quarters of an inch in length and the rear hook one-quarter of an inch in length, a dead weight of fifty pounds was easily supported.

The hook 13 may be attached in the opening 12 in any suitable way, so as to be either easily removable or not, as desired. I prefer, however, a semi-permanent assembly in which the opening 12 is too small to permit the ready removal of the hook, in this case the assembly being effected by inserting the shank of the hook through the opening 12 before the eyelet 13a is formed (Fig. 2). After the eyelet has been formed however, it is impossible to remove the hook without damaging it.

As to the shape of the minnow, this may vary, but I have obtained very satisfactory results by the general construction shown, in which concavo-convex contour results both transversely or longitudinally of the minnow. I have found that better action is obtained with this construction than with others which I have tried. With a concavo-convex shape this may be imparted to the minnow at any suitable stage in its manufacture. I have found, however, that the hole 16 may be bored while the minnow is flat, and the shank inserted. The forming operation of imparting the desired curvature to the minnow is then sufficient to press the metal of the minnow into the irregularities on the shank of the hook.

I obtain a number of advantages by means of the specific construction employed. The securing of the hook in the rear edge opening not only makes a very neat article, but most important, action through the water is obtainable with this construction not possible when the hook is attached to the minnow in any other way. The sides are smooth and the contour unbroken, and the bait therefore, slides through the water in perfect balance, without obstruction. Obviously it is able to take the natural movement resulting from its shape, which in actual practice I have found to be the case.

As to the material used, I have obtained the best results with a highly polished nickel silver finish on the body of the minnow, and a suitable rust-resisting finish on the hooks.

It is obvious, however, that I am not limited in any respect to the type of material used, nor the manner in which the bait is manufactured, the invention being limited only by the scope of the appended claims.

What I claim is new and desire to protect by Letters Patent of the United States is:—

1. In an artificial bait a metal minnow having body and tail portions, and of sufficient thickness for having a bored hole in the tail portion, and a fish hook having a shank with notched surfaces inserted in said hole, and the metal of the body pressed into the notched surfaces of the shank.

2. In an artificial bait, a metal minnow having body and tail portions, and having an opening near the front end of the body, a hook extending through said opening and loosely retained therein to act as a pivotal connection for said bait, the minnow having a bored hole in the tail portion, and a second hook with a notched shank inserted in said hole, and the metal of the body pressed into said notches of the shank.

In witness whereof, I hereunto subscribe my name this 13th day of August, 1930.

WALTER E. OSTER.